US005603055A

United States Patent [19]
Evoy et al.

[11] Patent Number: 5,603,055
[45] Date of Patent: Feb. 11, 1997

[54] SINGLE SHARED ROM FOR STORING KEYBOARD MICROCONTROLLER CODE PORTION AND CPU CODE PORTION AND DISABLING ACCESS TO A PORTION WHILE ACCESSING TO THE OTHER

[75] Inventors: David R. Evoy, Tempe; Lawrence D. Gould, Mesa, both of Ariz.; James R. Edwards, Tomball, Tex.; Donald G. Scharnberg, Pasadena, Tex.; Doyne L. Metz, Cypress, Tex.

[73] Assignee: VLSI Technology, Inc., San Jose, Calif.

[21] Appl. No.: 188,373

[22] Filed: Jan. 27, 1994

[51] Int. Cl.⁶ .......................... G06F 13/00; G06F 13/10
[52] U.S. Cl. .................. 395/652; 395/830; 395/427; 395/497.01; 395/497.04
[58] Field of Search .................. 395/474, 497.05, 395/497.04, 800, 828, 830, 700, 427, 497.01

[56] References Cited

U.S. PATENT DOCUMENTS

| | | | |
|---|---|---|---|
| 4,028,675 | 6/1977 | Frankenberg | 340/172.5 |
| 4,713,759 | 12/1987 | Yamagishi et al. | 364/200 |
| 4,908,789 | 3/1990 | Blokkum et al. | 364/900 |
| 4,926,372 | 5/1990 | Nakagawa | 364/900 |
| 5,101,490 | 3/1992 | Getson, Jr. et al. | 395/425 |
| 5,109,521 | 4/1992 | Culley | 395/800 |
| 5,287,481 | 4/1994 | Lin | 395/425 |
| 5,423,019 | 6/1995 | Lin | 395/425 |
| 5,473,775 | 12/1995 | Sakai et al. | 395/700 |

FOREIGN PATENT DOCUMENTS

| | | | |
|---|---|---|---|
| 1-74646 | 3/1989 | Japan | G06F 13/00 |
| 4-61578 | 2/1992 | Japan | H04N 5/76 |

*Primary Examiner*—Thomas C. Lee
*Assistant Examiner*—Le Thien Luu
*Attorney, Agent, or Firm*—LaValle D. Ptak

[57] ABSTRACT

A shared keyboard and system ROM uses a single ROM for both the keyboard and the system operating system information (BIOS). The shared ROM is never simultaneously used for both of these functions. At initial boot-up, the system processor executes from the shared ROM to copy the system BIOS information to the system Random Access Memory DRAM. Once this copying has been completed, the shared ROM then is used by the keyboard subsystem. Different address ranges are employed in the shared ROM for the keyboard information and for the system BIOS.

5 Claims, 3 Drawing Sheets

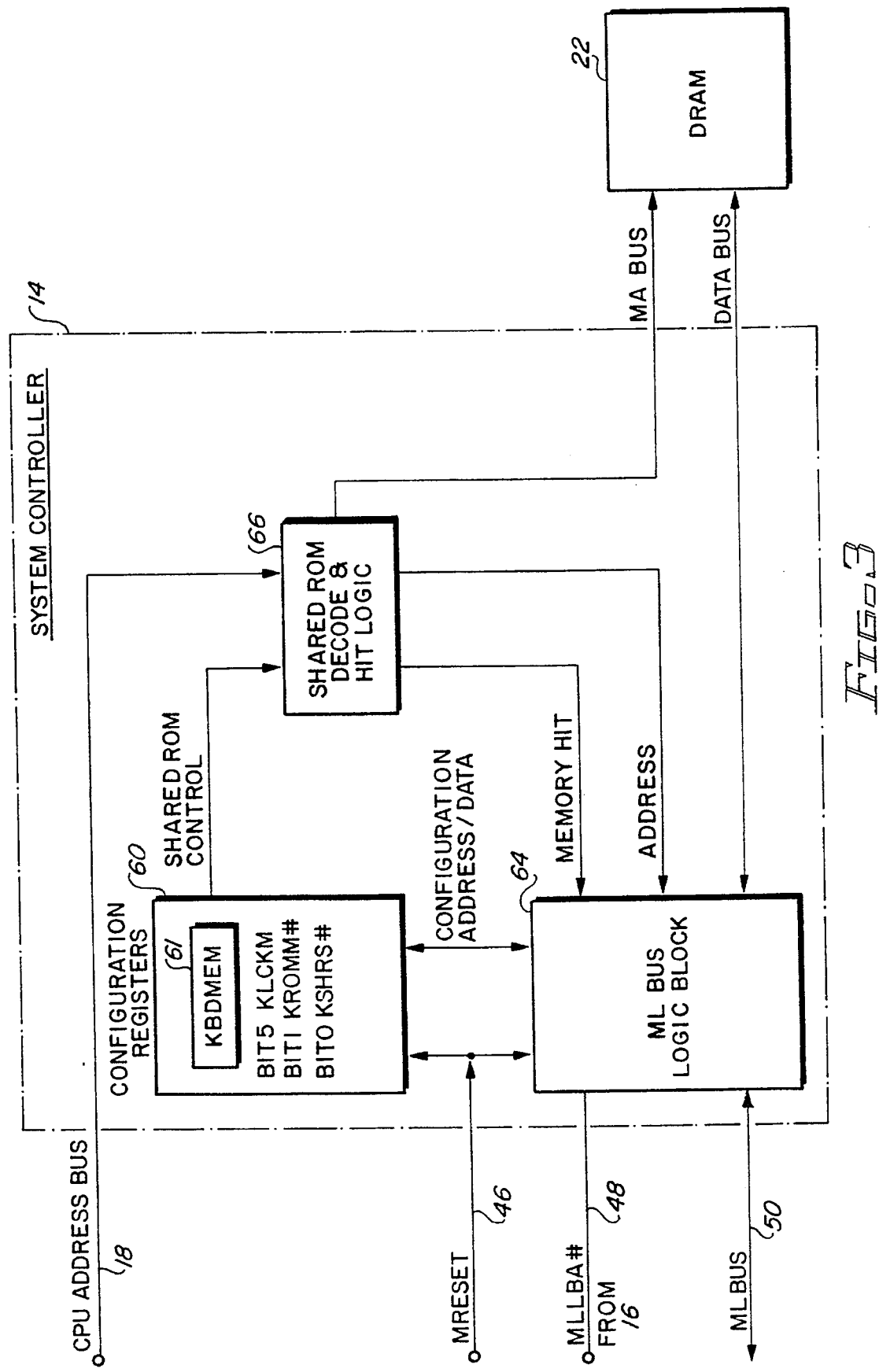

SINGLE SHARED ROM FOR STORING KEYBOARD MICROCONTROLLER CODE PORTION AND CPU CODE PORTION AND DISABLING ACCESS TO A PORTION WHILE ACCESSING TO THE OTHER

BACKGROUND

Current computer systems, particularly smaller systems such as desk-top personal computers (PC's), portable and lap-top systems, are continuously being designed to reduce the sizes of the various electronic devices in such computers, while simultaneously increasing the number of pieces of information which can be processed by the computers. In the development of computers of smaller physical size, with ever increasing capacity, multiplex address/data buses, along with multiplex system controllers, have been developed; so that the address buses and data buses of the Central Processing Units (CPU's) share common buses for sequentially transferring groups of address and data information to the memory input/output devices and input/output only devices. The development of multiplex systems and the associated controllers has permitted a significant reduction in the number of required pins for the various I/O devices in the systems.

Even with the development of multiplex systems for personal, lap-top, or portable computers, significant price competition exists in the industry. Prices of electronic components of such computers are impacted by the number of separate integrated circuit components which are required and by the amount of valuable board space needed for those different components. Consequently, systems are periodically redesigned to place larger numbers of functions in integrated circuit packages having as few address and data pins on them as possible.

In the past, a separate read-only memory (ROM) has been required for the keyboard subsystem; and a physically separate ROM has been required for the operating system information (BIOS). The BIOS ROM used for the operating system is necessary at the initial boot of the system to effect the system boot. Once the computer system is functioning, following the initial boot, the keyboard subsystem ROM is used during the operation of the computer to provide the necessary keyboard operating information to the computer system. Although neither of these separate ROM devices usually are of large capacity, the fact that two physically separate ROM's are used causes an increase in the complexity of the system solution, particularly in view of the extra expense of separate packages and the mounting real estate required for these separate packages. Additional pins are required to interconnect the separate ROM's with other portions of the computer system, all of which provides an upward price pressure on the finished manufactured product. During the initial boot-up of the computer system, the keyboard subsystem ROM is not operated. In addition, following the initial boot-up of the system, the operating system (BIOS) ROM is not operated.

Accordingly, it is desirable to provide a computer system which has reduced cost and reduced complexity by combining the separate keyboard subsystem and operating system ROM's into a single larger ROM, thereby reducing the overall cost of the system through lowering of the number of parts required.

SUMMARY OF THE INVENTION

It is an object of this invention to provide an improved computer system.

It is another object of this invention to provide an improved computer system using a single shared read-only memory (ROM) for multiple functions.

It is an additional object of this invention to provide an improved computer system using a single shared keyboard and operating system ROM.

It is a further object of this invention to provide an improved computer system using a single ROM for both the keyboard and the system BIOS ROM with different addresses for each of these functions.

In accordance with a preferred embodiment of this invention, a computer system includes a system controller, a peripheral controller and a central processing unit. The central processing unit is coupled with the system controller and peripheral controller through a multiplex address bus and a multiplex data bus for sending and receiving address and data information to and from the system controller and peripheral controller. A shared read-only memory (ROM) is coupled with the peripheral controller for storing keyboard information in one portion and operating system information (BIOS) in a second portion. When the main system reset is operated at the time of initial boot-up of the system, the keyboard portion of the shared ROM is disabled, and the system information (BIOS) portion of the ROM is used to supply the system information from the shared ROM. This information is transferred through the system controller to the system Random Access Memory (DRAM), where it is stored for subsequent use by the system during the remainder of the operation of the system. Once this transfer is complete, the BIOS portion of the ROM is disabled; and the keyboard portion of the ROM then is used in a conventional manner by the keyboard subsystem of the computer.

BRIEF DESCRIPTION OF THE DRAWINGS

FIG. 3 is a more detailed block diagram of another portion of the system shown in FIG. 1.

DETAILED DESCRIPTION

Figure 1:
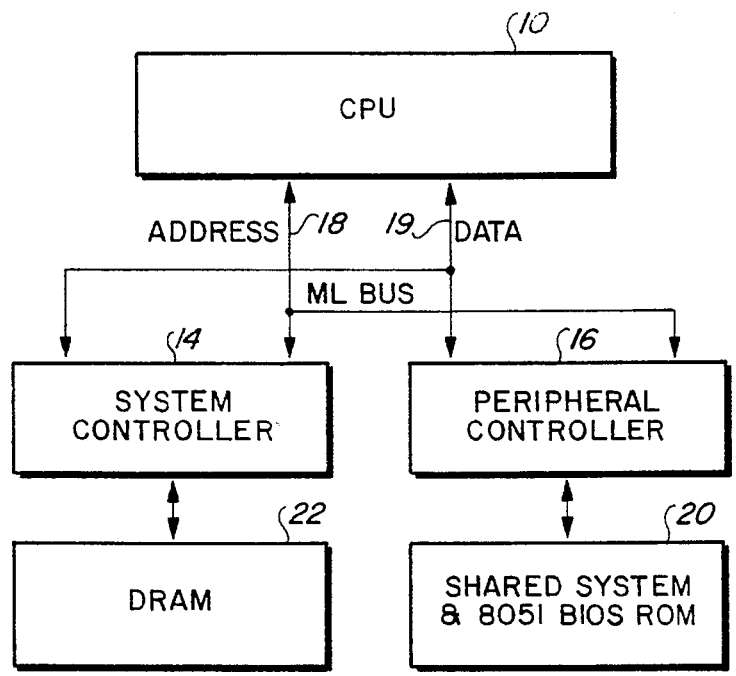
FIG. 1 is a block diagram of the overall system configuration of the preferred embodiment of the invention.

Reference now should be made to the drawings, in which the same reference numbers are used throughout the different figures to designate the same components. FIG. 1 illustrates a computer system including a central processing unit (CPU) 12, which is interconnected by address and data multiplex buses 18 and 19 to a system controller 14 and a peripheral controller (COMBO) 16. These components are common in personal computers (PC's), as well as in lap-top and hand-held computer systems.

In the system shown in FIG. 1, however, the peripheral controller 16 is interconnected with a single shared system and internal operating system (BIOS) ROM 20 instead of two separate read-only memories (ROM's) for storing the system or keyboard information and the internal operating system information. The system controller 14, in turn, is shown as interconnected by means of an address/data bus to a direct random access memory (DRAM) 22.

Figure 2:
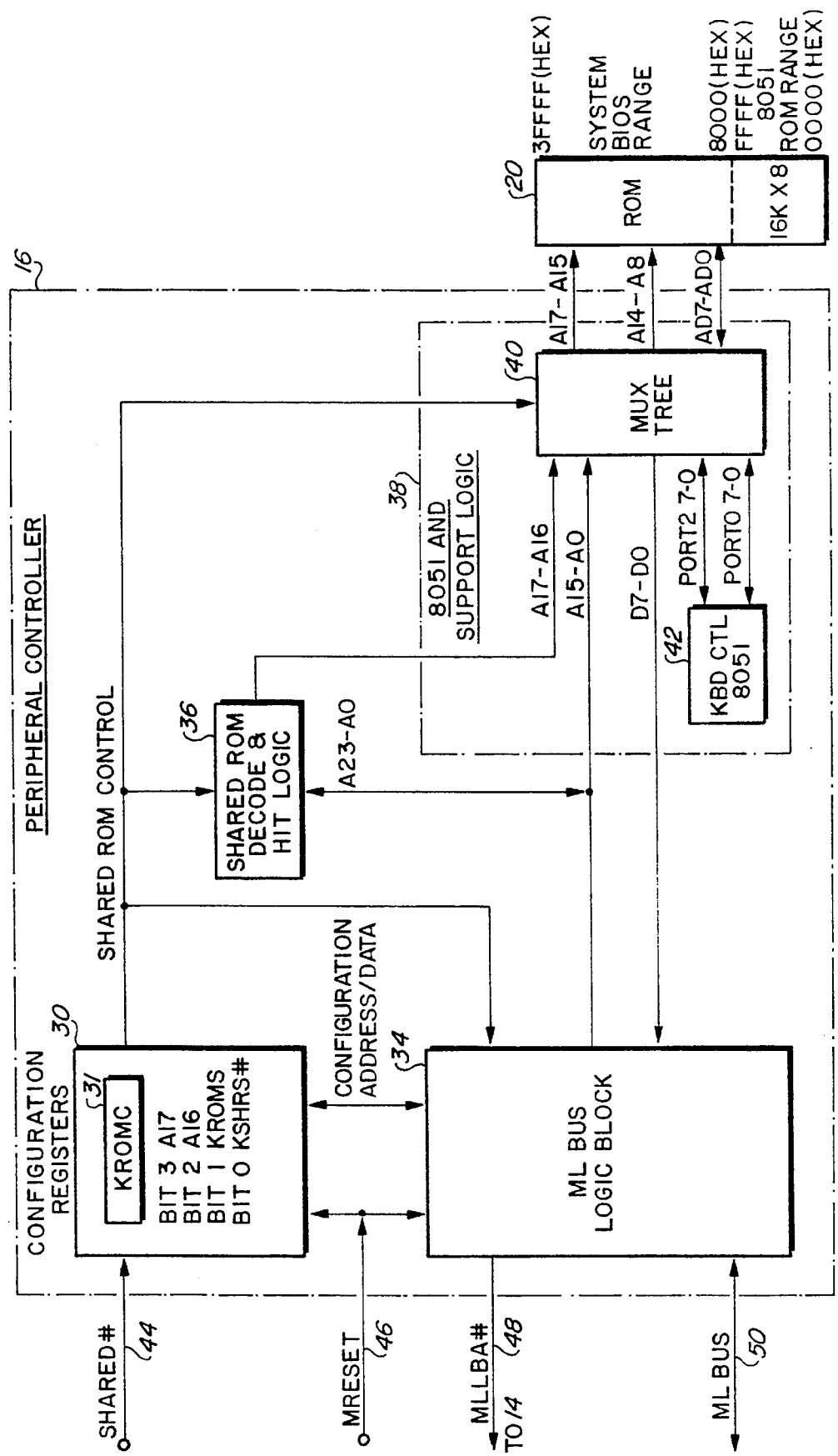
FIG. 2 is a more detailed block diagram of a portion of the system shown in FIG. 1.

With this overall system configuration in mind, reference next should be made to FIGS. 2 and 3, which illustrate in greater detail the internal block diagram configurations of the peripheral controller 16 and the system controller 14, respectively. The block diagram circuits, which are illustrated in FIGS. 2 and 3, are directed to the logic interconnections of the peripheral controller 16 and system controller 14, which are utilized to effect the shared ROM operation and signals for the single shared ROM 20, illustrated in FIG. 1 connected to the peripheral controller 16. The shared ROM 20 is illustrated in somewhat greater detail in FIG. 2; and the DRAM 22 is shown in FIG. 3 as connected to the system controller through an address bus (MA bus) and a data bus, respectively. The portions of the peripheral controller and system controller which are common to PC's and portable and lap-top computers, for the standard operation of these computers, are not shown in FIGS. 1, 2 and 3 to avoid unnecessary cluttering and complexity. Only the shared ROM signal paths and components which are involved in the implementation of the shared ROM operation are illustrated in these figures.

In the following description, various signal descriptions and definitions are provided to facilitate an understanding of the system operation; and these descriptions and definitions are given below:

MRESET—this is the main system reset, which is operated at initial power-up or boot-up of the computer system shown in FIG. 1.

MLLBA#—this is the multiplex device local bus access signal. In a multiplex system of the type shown in FIG. 1, a multiplex bus device asserts this low, true signal when a valid address transmitted on the CPU address bus is positively decoded. The first occurrence of this signal following the reset of the system at boot is used to latch the system controller 14 for the shared BIOS operation from the ROM 20, immediately following system boot.

KBDMEM—this is the keyboard register in the configuration register of the system controller 14.

KROMC—this is the keyboard ROM configuration register in the configuration register set of the peripheral controller 16.

KRAMM—this is the keyboard RAM bit, which in this system, comprises bit 6 of the KBDMEM register and for the purposes of this system, is always a "0".

KLCKM—this is a keyboard lock bit comprising bit 5 of the KBDMEM register; and for the purposes of the system shown in FIGS. 1, 2 and 3, this bit is always a "0".

KROMM#—this is the keyboard ROM memory of the KBDMEM register; and this bit goes to "0" for the shared ROM operation.

KROMS—this is bit 1 of the KROMC register in the peripheral controller, and is a keyboard ROM shared, which is set by the MRESET signal.

KBDCTL—this is the keyboard control register.

KSHRS#—this is bit "0" in the KROMC register, and is always a "0" for operation of the shared ROM system disclosed in FIGS. 1, 2 and 3.

Figure 4:
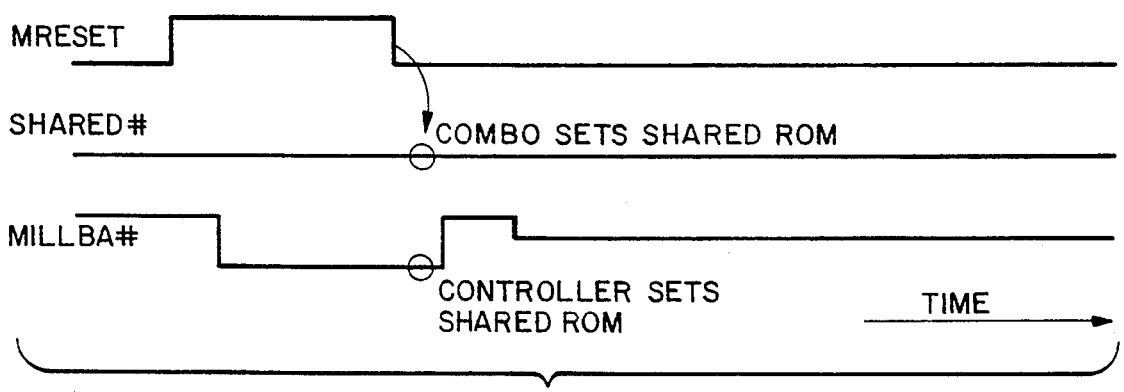
FIG. 4 illustrates waveforms useful in explaining the operation of the system shown in FIGS. 1, 2 and 3.

Reference now should be made to FIGS. 2 and 3 in conjunction with FIG. 1. Reference also should be made to FIG. 4, which indicates the primary control signals which are utilized at the beginning of the system boot to effect the shared ROM operation for utilizing the ROM 20 initially to provide the system BIOS information, and then subsequently to operate as the keyboard subsystem memory.

As illustrated in FIG. 4, when the system initially is booted, a signal MRESET, in the form of a positive pulse, is applied to the lead 46 shown in both FIGS. 2 and 3. This reset signal is the standard system reset in PC's and functions in its normal manner in the computer system to initialize various circuit components in the configuration registers 30 and 60 of the peripheral controller and system controllers 16 and 14, as well as in the ML bus logic blocks 34 and 64 in each of these controllers. In addition, however, this MRESET signal is gated with a ground or binary "0", which is continuously applied on the lead 44 (SHARED#FIG. 2) and through the configuration registers 30 to a shared ROM decode and hit logic 36, to set the peripheral controller 16 to its shared ROM mode of operation. The occurrence of the system reset MRESET also operates in the ML bus logic block 64 of the system controller 14 to supply the first multiplex local bus access signal (MLLBA#) over the lead 48 to the configuration register and to the ML bus logic block 34 in the peripheral controller 16. At the termination of the reset pulse MRESET, on the falling edge of the pulse, as shown in FIG. 4, when the MLLBA# signal is low, the system controller 14 is configured through the shared ROM decode and hit logic 66 to be configured for its shared ROM BIOS operation.

To effect the shared ROM operation, the single shared ROM 20 is partitioned or divided into two portions. The lower address portion, indicated below the dotted line in the ROM 20 in FIG. 2, is dedicated to the keyboard microcontroller code information. The ROM 20 typically is eight bits wide; and the keyboard information is located in the lower 16K addresses, indicated in FIG. 2 as 0000(Hex) to FFFF(Hex). The remainder of the ROM 20, namely the high addresses in the range 8000(Hex) to 3FFFF(Hex) are dedicated to the system BIOS information or CPU code. Typically, this "high address" portion of the ROM 20 may be 256K. This portion of the ROM may have a capacity greater or smaller than 256K bytes; but in all cases, the BIOS ROM is located in this high address portion of the ROM.

When the low address portion (the keyboard information) of the ROM is used, the high address portion for the system BIOS is rendered inoperative (i.e. access is blocked), and vice versa. This is the function of the peripheral controller 16 operating through the multiplex tree 40 from the shared ROM decode and hit logic 36, in conjunction with the multiplex bus logic block 34 and the keyboard control logic 42, illustrated in FIG. 2. It should be noted that in FIG. 2 the keyboard control is shown as using the Intel® 8051. Other keyboard control logic may be employed; but the specific ports for the address and data coupled between the keyboard controller 42 and the multiplex tree 40 are specific designations for the Intel® 8051. It should be noted that Port 0 of the keyboard controller 42 carries address and data (address/data) 7:0, while Port 2 carries address information only for address lines 7:0. The combination address/data for line 7:0 is indicated on the lower interconnection between the multiplex tree 40 and the ROM 20 in the address/data lines AD7:AD0 interconnecting the multiplex tree 40 and the ROM 20.

As noted above, the shared ROM 20 typically is eight bits wide. This is adequate for the 8051 keyboard control system, which is part of the peripheral controller (COMBO); but the system DRAM 22 coupled with the system controller 14 is the same width as the system processor. Typically, this width is thirty-two bits. In order to shadow or transfer the BIOS information from the shared ROM 20 to the DRAM 22, the shared ROM logic must make this translation from eight bits to thirty-two bits. In the system shown in FIGS. 2 and 3, the peripheral controller (COMBO) supplies these eight bits over the data lines D7:D0 from the multiplex tree 40 to the ML bus logic block 34. The logic block 34 then converts eight bits to sixteen bit ML bus accesses, which are supplied over the ML bus 50 to the MC bus logic block 64 in the system controller 14. These sixteen bit accesses are translated by the ML bus logic block 64 to the thirty-four bit access for the processor. During this initial phase of the operation, the shared ROM 30 is dedicated to the system BIOS processor; and the keyboard subsystem, operated by the keyboard controller 42, is disabled. It should be noted that the logic, which responds to the signal waveforms shown in FIG. 4, is conventional gate and latch logic used in the shared ROM decode and hit logic blocks 36 and 66 of the peripheral controller 16 and system controller 14, respectively.

With the keyboard subsystem disabled, addressing the system BIOS range of the ROM 20 is controlled by the KBDMEM register in the controller. This controller controls the keyboard ROM/RAM access. It is used to control the downloadable RAM keyboard option, and also has bits for the shared ROM. This register must be updated by software. The register is configured as follows:

| Data Port ED | D7 | D6 | D5 | D4 | D3 | D2 | D1 | D0 |
|---|---|---|---|---|---|---|---|---|
| KBDMEM (CAh) | | KRAMM | KLCKM | | | | KROMM# | KSHRM# |
| POR Value | 1 | 0 | 0 | 0 | 0 | 0 | MLLBA# | MLLBA# |

For the system using the shared ROM 20, bit D6, KRAMM, always is set to "0"; so that the system responds as a shared ROM system. Utilization of the system controller 14 for conventional systems, which use separate keyboard system ROM's and BIOS ROM's, operate with this bit set to "1". For the present purposes, this bit always may be considered to be "0". Bit D5, KLCKM, is a keyboard lock bit; and, again, this bit has no meaning with respect to the operation of the shared ROM circuit of this invention. It is utilized for other functions in the system. Consequently, the only two bits of significance with respect to the shared ROM operation are bits D1 and D0. Bit D1, KROMM#, is latched at the trailing edge of MRESET to the level on the MLLBA# pin. This is indicated in FIG. 4. If this bit is "0", the shared ROM is enabled; and when the peripheral controller (COMBO) 16 also is set for the shared ROM operation, the system responds as a memory device at the system BIOS range 8000(Hex) to 3FFFF(Hex) indicated on the ROM 20 in FIG. 2. The system controller 14 generates the MLLBA# signals internally in the ML bus logic block 34 for all memory accesses in this range. This bit, KROMM#, can be set (1) by software, ending the shared ROM mode. This bit cannot be cleared (0) by software, making the shared ROM protected from inadvertent access.

Bit D0, KSHRM#, is latched at the trailing edge of MRESET (low to high transition) to the level on the MLLBA# pin. This bit cannot be changed by software; it is read-only. This bit indicates that a shared ROM was used to boot the system. For the peripheral controller (COMBO), the register KROMC in the COMBO chip has the following configuration:

Bits 7:5 currently are directed to extended features other than those used for the shared ROM mode. The shared ROM mode is enabled independently through the grounded (0) signal (SHARED#) on the lead 44 (FIG. 2). Bit D4 of the KROMC register is reserved, and is not used in the shared ROM mode. Bits D3:D0 are employed for controlling the address lines and operation of the high addresses for the system BIOS range of the shared ROM 20. Bit D1, KROMS is latched at the trailing edge of MRESET, as indicated in FIG. 4, to a value opposite the level on the SHARED# pin (one if SHARED# is low, 0 if SHARED# is high). For the shared ROM mode of operation, the SHARED# pin always is at "0"; so that the shared ROM is enabled. This causes the shared ROM decoder and hit logic 36 to cause the peripheral controller 16 to respond as a memory device at the system BIOS range of memory indicated in FIG. 2 for the ROM 20. This KROMS bit can be cleared by software, ending the shared ROM mode; but this bit cannot be set by software.

Thus, the shared ROM 20 is protected from inadvertent access.

Bit D0, KSHRS#, is 0 when the SHARED# pin is low. Consequently, a 0 in this bit indicates that the system booted from a shared ROM. This may be used as an indication of the system configuration, even after the shared ROM mode is terminated by the KROMS bit. This bit cannot be changed by software, it is read-only.

With the system interconnections shown in FIGS. 2 and 3 and the configurations of the KBDMEM register 61 and KROMC register 31 illustrated above, the peripheral controller (COMBO) latches in the state of the SHARED# pin at the trailing edge of MRESET. As noted above, the SHARED# pin is connected to ground, or is a binary "0" in the shared ROM system described herein. When this latch occurs, the ML bus interface in the bus logic block 34 of the peripheral controller 16 responds as a slave device to the boot addresses and the normal BIOS addresses. The system controller 14 is responsible for ensuring that ML bus cycles are run for the ROM 20 in the peripheral controller 16. The peripheral controller 16 cannot generate the MLLBA# signal because it only connects to the low order address lines, and cannot satisfy the memory timing requirements for the ML bus protocol. The address to the shared ROM is shown in FIG. 2 comprising the address on the ML bus (bits A15:A0) and two bits A17:A16 controlled by the KROMC register 31 (Bits D2 and D3 of that register) through the shared ROM decode and hit logic 36.

SHARED ROM BOOT SEQUENCE

As noted above, RESET is asserted. The peripheral controller then asserts MLLBA# low in response to the MRE-

| Data Port EDh | D7 | D6 | D5 | D4 | D3 | D2 | D1 | D0 |
|---|---|---|---|---|---|---|---|---|
| KROMC Index 5Eh | | EXFEA | | R | KA17 | KA16 | KROMS | KSHRS# |
| POR Value | 0 | 0 | 0 | 0 | 1 | 1 | SHAREN#pin | SHAREN#pin |

SET, as described above. This provides an indication to the system controller that the shared ROM mode will be used.

At the trailing edge of MRESET (high to low transition), the peripheral controller, through the shared ROM decode and hit logic 36, latches in the state of the MLLBA# pin. A low (as shown in FIG. 4) enables the shared ROM feature. A latch (not shown) in the shared ROM decode and hit logic 36 stores this ROM access mode. This latch is only set by MRESET, and cannot be changed by software. As noted above, the bit KSHRM# in the KBDMEM register performs this function.

The system controller 14 assumes that all memory cycles in the range for the high addresses, namely 8000(Hex) to 3FFFF(Hex) as shown in FIG. 2 for the ROM 20, are for the BIOS ROM. The particular 64K ROM segments in this portion of the shared ROM 20 are mapped by the A17:A15 bits to any of four 64K ROM segments. The system controller 14 does not use an external MLLBA# pin for the boot process. When the ROM access mode is set at MRESET time, as described above, to a shared ROM, the system controller 14 generates the MLLBA# internally. It should be noted that internal DRAM hits have a higher priority than the MLLBA#. This allows normal shadow operation to occur. The system controller 14 always can assert the internal MLLBA# signal; but the internal signal (as well as the external pin), are ignored when the DRAM controller generates a hit signal. This allows the ROM 20 to be read and the DRAM 22 to be written (later in this sequence).

At this time, the first operating code is fetched from the shared ROM via the ML bus (independent of the level on the MLLBA# pin). The system, while executing out of the shared ROM 20, addressed at A17:A15 and A14:A8 (see FIG. 2) through the multiplex tree 40, enables and configures the system DRAM 22.

Using the standard operation of shadow bits in the system controller 14, any portions of the shared ROM 20 which are needed during normal operation of the overall system shown in FIG. 1, are copied to the DRAM 22. The top of the shared system BIOS ROM initially exists both at the F000 segment and at the E000 segment. The A17 and A16 bits in the KROMC register control the E000 segment window into the 256K shared ROM. The E000 window can be used to page one of four 64K banks. As alternate blocks are paged into segment E000, they can be shadowed/moved into the DRAM 22 through the address bus (MA bus) under the control of the shared ROM decode and hit logic 66 supplied with the necessary information through the ML bus logic blocks 34 and 64 and the configuration registers 60.

After all of the copying of information into the DRAM 22 is completed, the KROMS bit in the peripheral controller configuration register 31 and the KROMM bit in the KBD-MEM register 61 in the system controller 14 are switched by software. This disables the shared ROM 20 in preparation for using the shared ROM 20 for exclusive use of the keyboard, under control of the keyboard controller 42 in the peripheral controller 16. When this occurs, the keyboard controller 42 operates through the multiplexed low address/data bus lines AD7:AD0 through the multiplex tree 40 to initiate conventional keyboard operation of the ROM 20. The ROM address lines A17:A15, which addressed the upper portion of the shared ROM 20 are then set to "0", disabling the BIOS portion of the ROM 20 for the remainder of the operation of the system. The keyboard subsystem 38 of the peripheral controller 16 then functions normally. It should be noted that when the shared ROM operation is disabled, the system controller enables the shadow memory for resume functions.

The foregoing description of the preferred embodiment of the invention should be considered as illustrative, and not as limiting. Various changes and modifications will occur to those skilled in the art for performing substantially the same function, in substantially the same way, to achieve substantially the same result, without departing from the true scope of the invention as defined in the appended claims.

We claim:

1. A method for operating a computer system using a single shared ROM memory for dissimilar processor types including a keyboard microcontroller and a host operating CPU comprising the steps of:

configuring a single ROM memory into two portions, the first portion dedicated to storing keyboard microcontroller code information and the second portion dedicated to storing operating CPU code (BIOS);

disabling access to the first portion of said ROM at initial boot-up of the computer, and enabling access to the second portion of said ROM at initial boot-up of the system;

transferring the operating system information in the second portion of said ROM to a system random access memory (RAM) for subsequent use by the computer system; and upon completion of transfer of the operating system information from the second portion of the shared ROM to the system random access memory, disabling access to the second portion of said ROM and enabling access to the first portion of said ROM for subsequent execution and use by the keyboard microcontroller.

2. The method according to claim 1 wherein the step of disabling access to the first portion of said ROM and enabling access to the second portion of said ROM at initial boot-up of the system is effected in response to a main system reset signal generated at initial boot-up.

3. A computer system including in combination:

a system controller;

a peripheral controller;

a multiplex bus for transferring address and data information between said system controller and said peripheral controller;

a system Random Access Memory (RAM) coupled with said system controller;

a shared Read Only Memory (ROM) coupled with said peripheral controller for storing keyboard microcontroller code information in a first portion and operating CPU code (BIOS) in a second portion;

a main system reset signal source coupled with said system controller and said peripheral controller for supplying a reset signal to both of said controllers;

said peripheral controller responsive to said reset signal for disabling access to the first portion of said shared ROM and for enabling addressing of the second portion of said shared ROM to supply the BIOS information through said bus and said system controller to said system RAM to configure said system RAM; and logic means in said peripheral controller responsive to completion of transfer of the BIOS information from said shared ROM to said DRAM for disabling access to said second portion of said ROM and enabling access to said first portion of said ROM for subsequent execution and use by said peripheral controller.

4. The combination according to claim 3 wherein said first and second portions of said shared ROM comprise first and second address ranges.

5. The combination according to claim 4 wherein said first address range comprises a predetermined number of the lowest addresses for said ROM, and said second address range comprises addresses above said predetermined number of addresses.

\* \* \* \* \*